United States Patent
Wu et al.

(10) Patent No.: US 10,778,623 B1
(45) Date of Patent: Sep. 15, 2020

(54) MESSAGING AND GAMING APPLICATIONS COMMUNICATION PLATFORM

(71) Applicant: Snap Inc., Santa Monica, CA (US)

(72) Inventors: William Wu, Marina del Rey, CA (US); Dylan Shane Eirinberg, Venice, CA (US); Alexander R. Osborne, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 43 days.

(21) Appl. No.: 16/177,335

(22) Filed: Oct. 31, 2018

(51) Int. Cl.
| | |
|---|---|
| *H04L 12/58* | (2006.01) |
| *A63F 13/87* | (2014.01) |
| *A63F 13/795* | (2014.01) |
| *A63F 13/48* | (2014.01) |
| *G06F 3/0482* | (2013.01) |
| *G06F 3/16* | (2006.01) |

(52) U.S. Cl.
CPC .............. *H04L 51/10* (2013.01); *A63F 13/48* (2014.09); *A63F 13/795* (2014.09); *A63F 13/87* (2014.09); *A63F 2300/556* (2013.01); *A63F 2300/572* (2013.01); *A63F 2300/636* (2013.01); *G06F 3/0482* (2013.01); *G06F 3/165* (2013.01)

(58) Field of Classification Search
CPC ........ H04L 51/10; A63F 13/795; A63F 13/87; A63F 13/48; A63F 2300/636; A63F 2300/556; A63F 2300/572; G06F 3/0482; G06F 3/165
See application file for complete search history.

(56) References Cited

U.S. PATENT DOCUMENTS

| | | | |
|---|---|---|---|
| 2008/0105751 A1* | 5/2008 | Landau | A63F 13/10 |
| | | | 235/492 |
| 2012/0233235 A1* | 9/2012 | Allaire | B01J 6/008 |
| | | | 717/109 |
| 2013/0260896 A1* | 10/2013 | Miura | H04N 21/4781 |
| | | | 463/42 |
| 2015/0011311 A1* | 1/2015 | Relan | A63F 13/355 |
| | | | 463/31 |
| 2017/0039390 A1* | 2/2017 | King | G06F 21/6245 |
| 2018/0229128 A1* | 8/2018 | Chandrasekaran | A63F 13/87 |
| 2018/0304159 A1* | 10/2018 | Campos | H04L 51/32 |
| 2018/0367484 A1* | 12/2018 | Rodriguez | G06Q 10/101 |
| 2019/0370805 A1* | 12/2019 | Van Os | G06F 3/0484 |

* cited by examiner

Primary Examiner — Michael A Keller
(74) Attorney, Agent, or Firm — Schwegman Lundberg & Woessner, P.A.

(57) ABSTRACT

Aspects of the present disclosure involve a system comprising a computer-readable storage medium storing at least one program and a method for providing a platform that facilitates communication between a messaging application and a web-based gaming application. The web-based gaming application is launched, via the platform, from the messaging application. Context of the messaging application from which the web-based gaming application was launched is determined. The context of the messaging application is communicated, via the platform, to the web-based gaming application. A feature of the messaging application is integrated, via the platform, into the web-based gaming application based on the context from which the web-based gaming application was launched.

19 Claims, 9 Drawing Sheets

MESSAGING AND GAMING APPLICATIONS COMMUNICATION PLATFORM

TECHNICAL FIELD

The present disclosure relates generally to a software development kit (SDK) and more particularly to facilitating interactions between messaging and gaming applications using the SDK.

BACKGROUND

The popularity of users interacting with other users online continues to grow. There are many ways for users to interact online with other users. Users can communicate with their friends using messaging applications and can play with other users online in multiplayer video games. However, there remains a disconnect between the people the user communicates with using the messaging applications and the people the user plays with in the multiplayer video games. In particular, a user typically has to leave a certain video game the user is playing to communicate with the user's friends through the messaging application and the user has to leave a conversation the user is having in the messaging application to play the video game.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
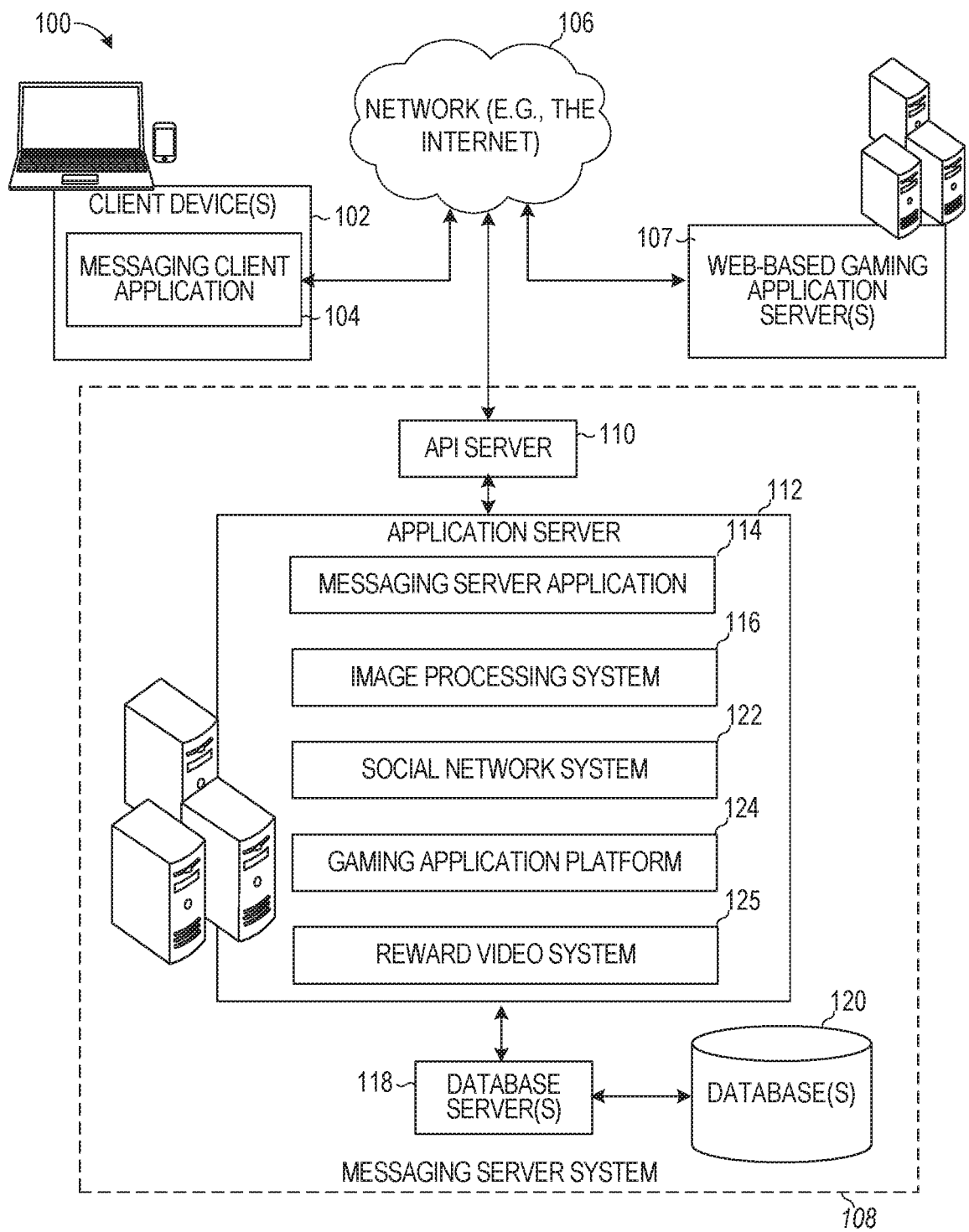
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users utilize a messaging application to talk to their friends and a multiplayer video game to play with some known or an unknown group of users (a group that may not include their friends from the messaging application). This leaves the users with having to choose whether to talk to their friends on the messaging application or play with strangers in a video game application. In addition, while certain video game applications allow the user to chat with other users in the video game application, such chatting is limited to the users of the video game application (which may not include the user's friends on the messaging application) and has to be performed through the graphical user interface (GUI) of the video game application. Chatting through the GUI of the video game application typically results in poor user experience because the GUI of the gaming application is not only unfamiliar to the user but may also have limited, reduced and different functionality than that of the messaging application GUI. The disclosed embodiments improve the functionality of electronic messaging software and systems and web-based gaming application software and systems by providing a platform for facilitating communication between the messaging software and systems and the web-based gaming application software and systems for integrating functions of the messaging application into the web-based gaming application.

By providing a platform that facilitates communication between the messaging application and the web-based gaming application, according to certain embodiments, the web-based gaming application can securely obtain user data from the messaging application to enable the user to, for example, continue a conversation with their friends from the messaging application and play the game with those friends or choose which friends from the messaging application the user would like to play the game with. Using the platform, only the information necessary for the user to play a game with friends from the messaging application is provided by the messaging application to the gaming application. For example, features of the GUI of the messaging application, such as conversation size, chat color, avatar information, etc., are provided to and integrated into the gaming application.

In this way, depending on whether the user launched the gaming application from a conversation or not (e.g., from a discovery interface), certain features of the messaging application can be integrated. For example, if the user launched the gaming application from a conversation in the messaging application, conversation information can be provided to the gaming application to allow the user to continue the conversation with their friends while playing the game with them. By integrating features of the GUI of the messaging application into the gaming application, the user can continue the conversation through the look and feel of the messaging application (e.g., the familiar messaging application GUI) and can access advanced conversation features of the messaging application (e.g., avatars, voice communication, etc.) which improves the overall user experience. Alternatively, if the user launched the gaming application from a non-conversation interface of the messaging application (e.g., a discovery interface), only an identifier of the user is provided to the messaging application and, only upon request from the gaming application, a list of friends a user chooses to play with is provided. The gaming application communicates with the messaging application using the platform which allows the user to choose friends to play with on the gaming application through the look and feel of the messaging application thereby further improving the overall user experience.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

Each messaging client application 104 is also able to communicate with one or more web-based gaming application server(s) 107. Each web-based gaming application server 107 hosts, for example, an HTML5 based game. Particularly, the messaging client application 104 launches a web-based game by accessing the HTML5 file from the web-based gaming application server 107 associated with the game. In certain embodiments, the games hosted by web-based gaming application server 107 are programmed in JavaScript leveraging an SDK stored on gaming application platform 124 provided by the messaging server system 108. The SDK includes application programming interfaces (APIs) with functions that can be called or invoked by the web-based gaming application. In certain embodiments, the gaming application platform 124 includes a JavaScript library that provides a given gaming application access to certain user data of the messaging client application 104. HTML5 is used as an example technology for programming games, according to some embodiments, but games programmed based on other technologies can be used.

In order to integrate the functions of the SDK into the game, the SDK is downloaded by the web-based gaming application server 107 from the messaging server system 108 or is otherwise received by the web-based gaming application server 107. Once downloaded or received, the SDK is included as part of the application code of the web-based game. The code of the web-based game can then call or invoke certain functions of the SDK to integrate features of the messaging client application 104 into the web-based gaming application. Some of the functions and functionality of the SDK which the web-based gaming application and the messaging client application 104 can call are discussed in detail below in connection with FIGS. 4-7.

The SDK stored on gaming application platform 124 effectively provides the bridge between the web-based gaming application and the messaging client application 104. This provides the user with a seamless experience of communicating with their friends on the messaging client application 104 preserving the look and feel of the messaging client application 104 while playing a web-based gaming application. To bridge the web-based gaming application and the messaging client application 104, in certain embodiments, the SDK facilitates communication between the web-based gaming application server 107 and the messaging client application 104. In certain embodiments, a WebView-JavaScriptBridge running on a client device 102 establishes two one-way communication channels between the web-based gaming application and the messaging client application 104. Messages are sent between the web-based gaming application and the messaging client application 104 via these communication channels asynchronously. Each SDK function invocation is sent as a message and callback for each SDK function is implemented by constructing a unique callback identifier and sending a message with that callback identifier.

By utilizing the SDK, not all of the information from the messaging client application 104 is shared with the web-based gaming application server 107. The SDK limits which information is shared based on the needs of the web-based gaming application and based on a context from which the web-based gaming application was launched by the messaging client application 104.

In certain embodiments, each web-based gaming application server 107 provides the HTML5 file corresponding to the web-based gaming application to the messaging server system 108. The messaging server system 108 can add a visual representation of the game in the messaging client application 104. Once the user selects the visual representation or instructs the messaging client application 104 through a GUI of the messaging client application 104 to launch the game, the messaging client application 104 obtains the HTML5 file and initiates all the resources necessary to launch the game. In some cases, the messaging client application 104 accesses the corresponding web-based gaming application server 107 to launch the game.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 and the web-based gaming application server 107 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections: the retrieval of a list of friends of a user of a client device 102; the retrieval of messages and content; the adding and deleting of friends to a social graph; the location of friends within a social graph; access to reward videos stored on reward video system 125; access to user conversation data: access to avatar information stored on messaging server system 108; access to authentication tokens; access to a leaderboard; access to game score information; and opening an application event (e.g., relating to the messaging client application 104).

The application server 112 hosts a number of applications and subsystems, including a messaging server application 114, an image processing system 116, a social network system 122, gaming application platform 124, and reward video system 125. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The reward video system 125 stores multiple advertisements. These advertisements may include a collection of video clips (e.g., 30-40 second video clips). A given web-based gaming application can use the advertisements stored on reward video system 125 to provide a reward to a user in the web-based gaming application. For example, a user can be provided with the option to watch a given advertisement in the video game to advance a level, to upgrade armor or weapons, to increase a score, or to purchase game content. The reward video system 125 can include a collection of profiles for each user of the messaging server system 108. Based on the profiles, the reward video system 125 can select advertisements suitable or that may interest a given user. The reward video system 125 may also keep track of which advertisements each user of the messaging server system 108 has watched to avoid presenting the same advertisements multiple times to the same user. Leveraging the reward video system 125 managed by the messaging server system 108 avoids the web-based gaming application server 107 having to obtain and manage its own advertisements. The manner in which reward videos are provided to a given player in the web-based gaming application using reward video system 125 is discussed in more detail below in connection with FIG. 6.

The application server 112 is communicatively coupled to a database server 118, which facilitates access to a database 120 in which is stored data associated with messages processed by the messaging server application 114.

Figure 2:
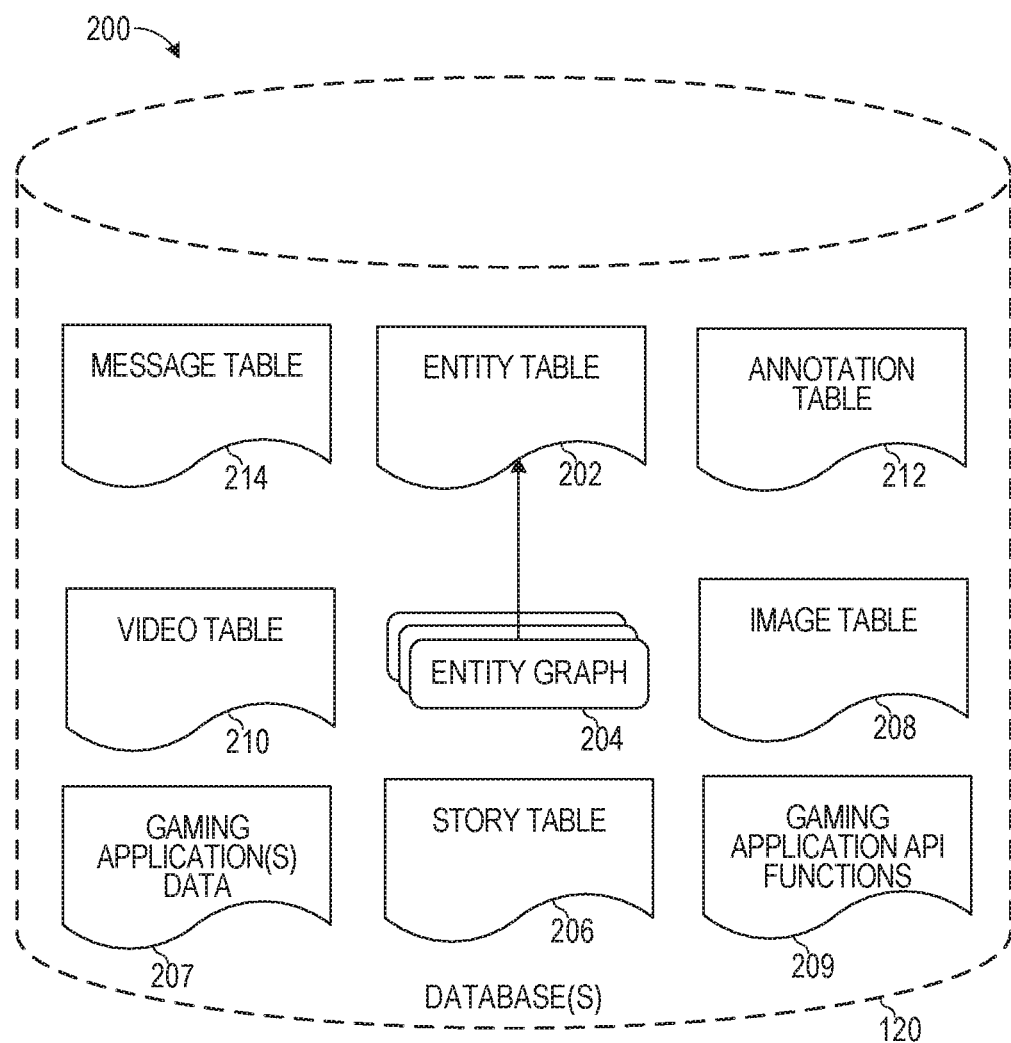
FIG. 2 is a schematic diagram illustrating data which may be stored in the database of the messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Gaming application(s) data 207 stores gaming information associated with one or more web-based gaming application. Such gaming information may include a visual representation or icon of the given web-based game. Such a visual representation is used by the messaging application to identify the game and allow the user to select the visual representation to launch the game. The gaming information may include information identifying the maximum number of players a given game can host. This information is used by the messaging application to determine whether a game launched from a given conversation having a certain number of participants can support all of the participants of the conversation. The gaming information may include score information for each game. Such score information can be used by the messaging application to manage and maintain a leaderboard that is specific to each game and/or that is geographically relevant. Namely, the leaderboard can represent leaders of the web-based game among a group of users in a particular geographical location or across the entire list of users of the messaging application. A leader represents a user with a higher score than another user though other attributes can be used to define a leader (e.g., a user who plays a game more time than another user).

Gaming application API functions 209 stores a number of functions of the SDK stored on gaming application platform 124. The gaming application API functions 209 stores the code that is executed when a given function of the API is invoked by the web-based gaming application or the messaging client application 104. Such API functions can include:

A function to initialize the web-based gaming application.
A function to set a volume of the web-based gaming application.
A function to provide an authentication token to the web-based gaming application.
A loading progress function which indicates to the messaging application the loading progress of the web-based game.
A loading complete function which indicates to the messaging application that loading of the web-based game has completed.
A fetch avatar image function which is used by the web-based gaming application to obtain an avatar matching a given user(s)' identification.
A play with friends function to allow a user to select friends of the user on the messaging application to play with using the look and feel of the messaging application.
Reward video related functions to retrieve advertisements from reward video system 125 and track whether the user completed watching the given advertisements.
A leaderboard function to allow the web-based game to retrieve the leaderboard from gaming application data 207 to present to the user.
A submit score to leaderboard function to allow the web-based game to send to the messaging application score information for a given user to be updated in the leaderboard stored in the gaming application data 207.
An add/remove user function to allow the messaging application to add or remove users from the web-based gaming application.
A focus function to allow the messaging application to inform the web-based gaming application whether the user has lost/regained focus in the game so that the game knows the user is or is not active in the game and whether the user can or cannot interact with the game directly.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
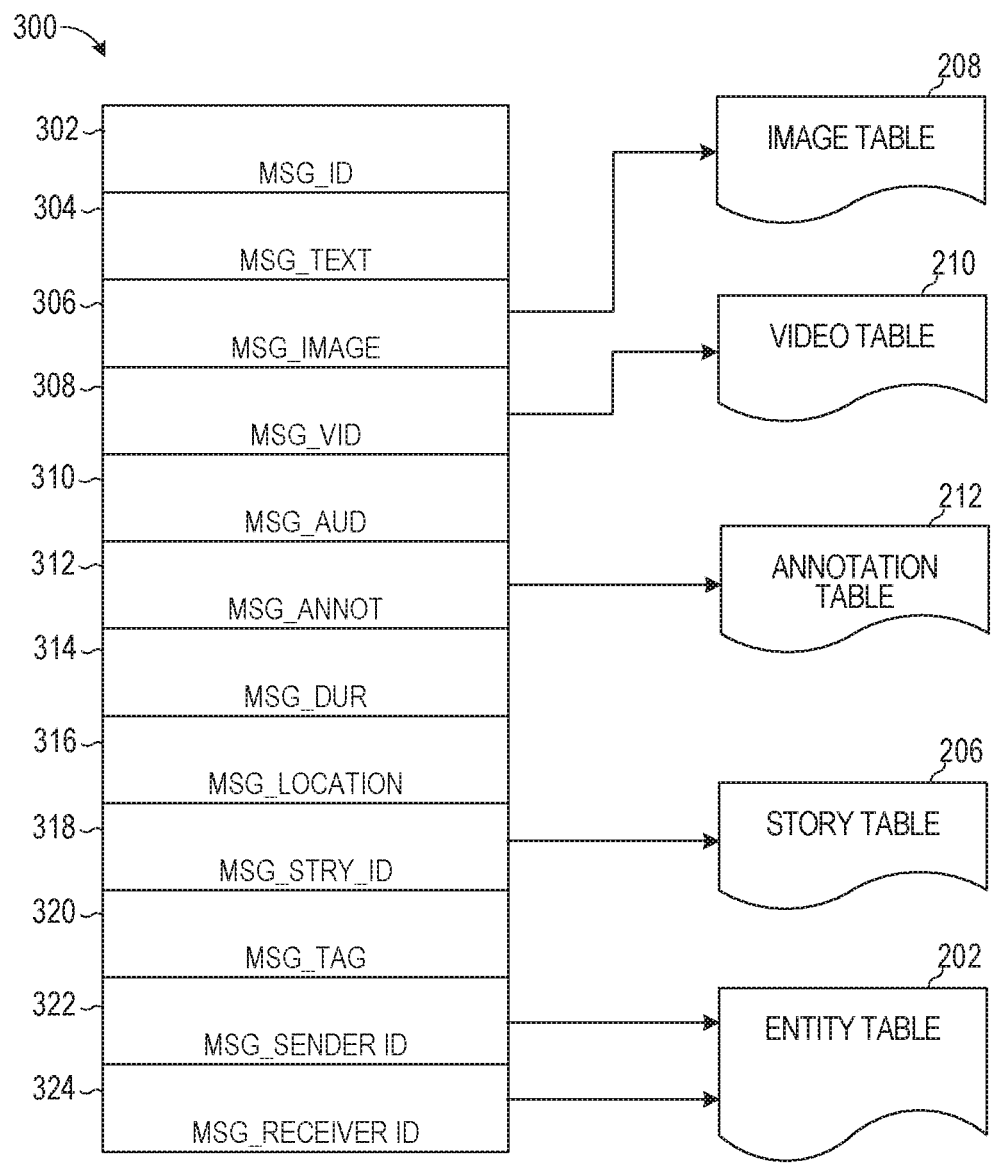
FIG. 3 is a schematic diagram illustrating a structure of a message generated by a messaging client application for communication, according to example embodiments.
Figure 4:
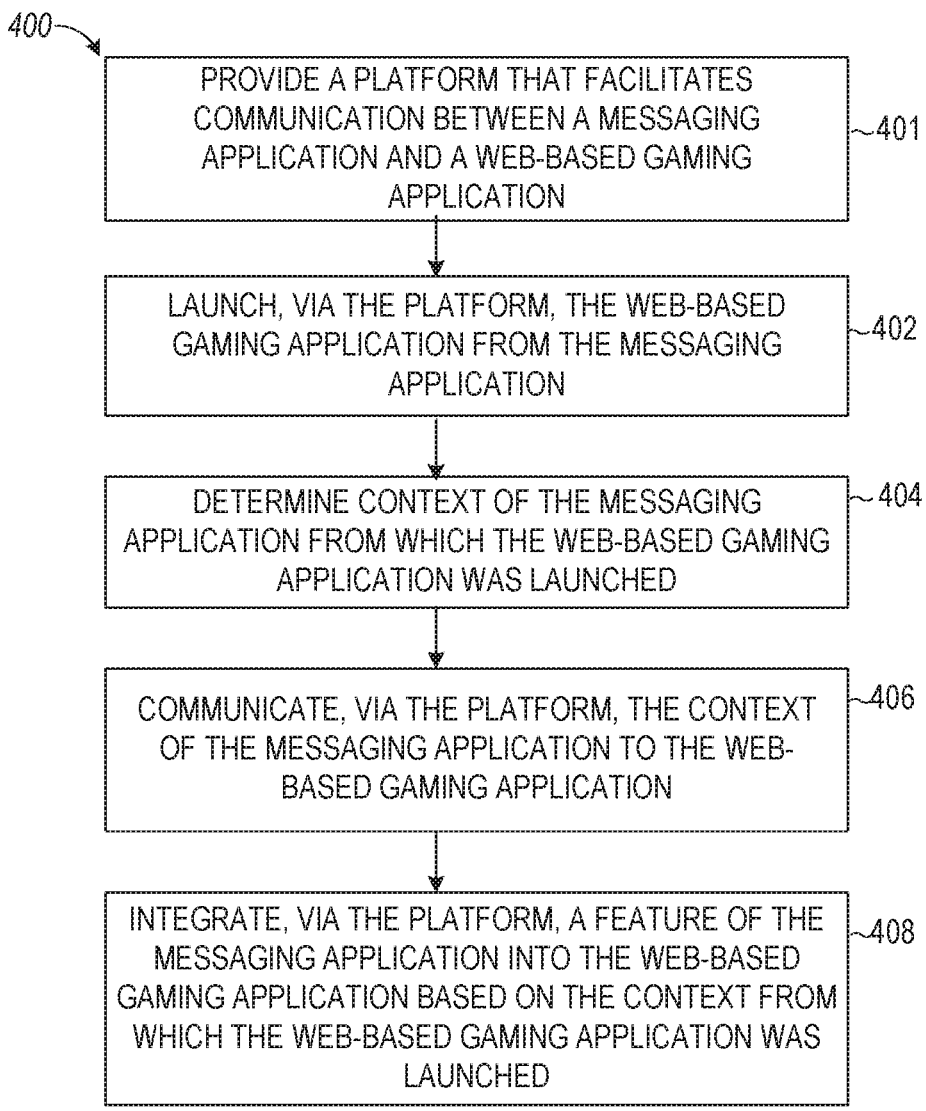
FIGS. 4-7 are flowcharts illustrating example operations of the gaming application platform in performing a process for facilitating interactions between a messaging application and a web-based gaming application, according to example embodiments.
Figure 5:
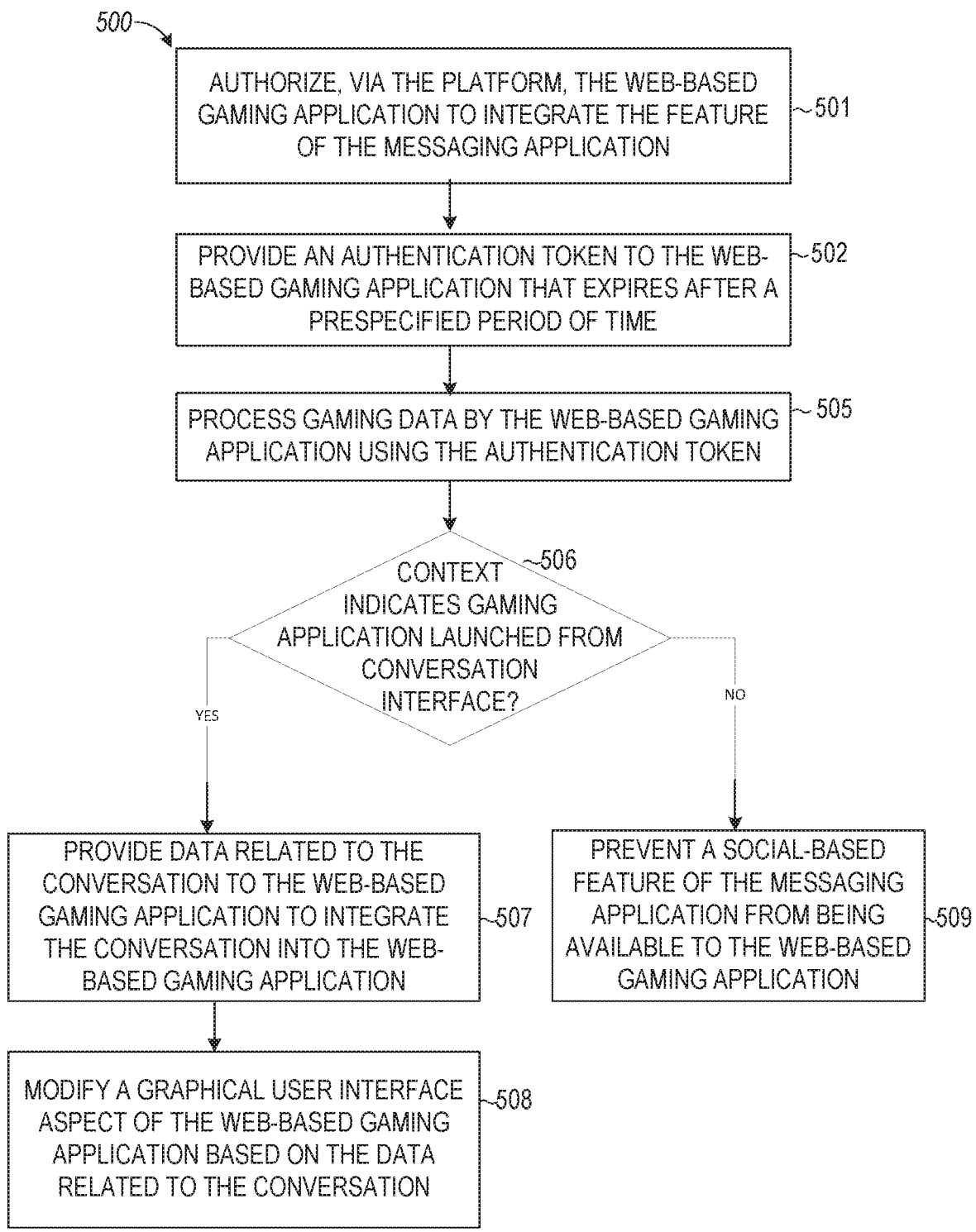
Figure 6:
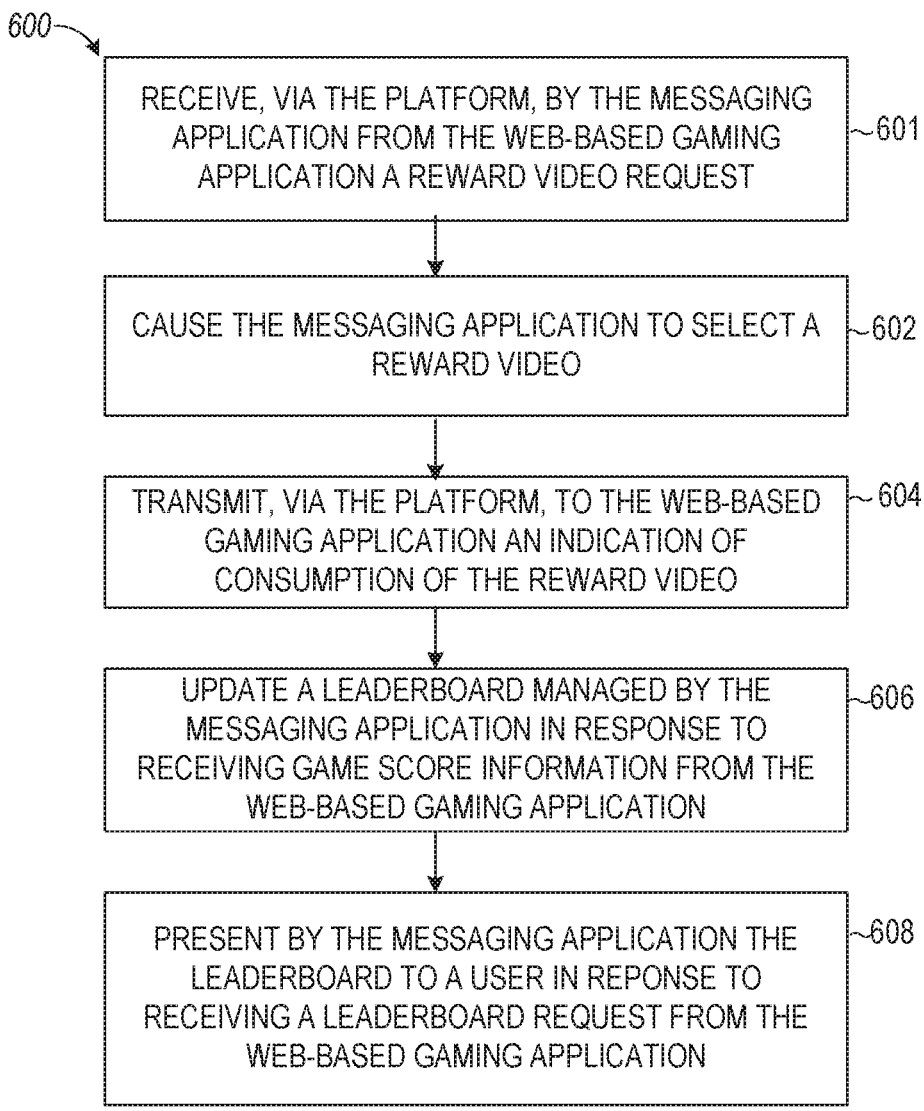
Figure 7:
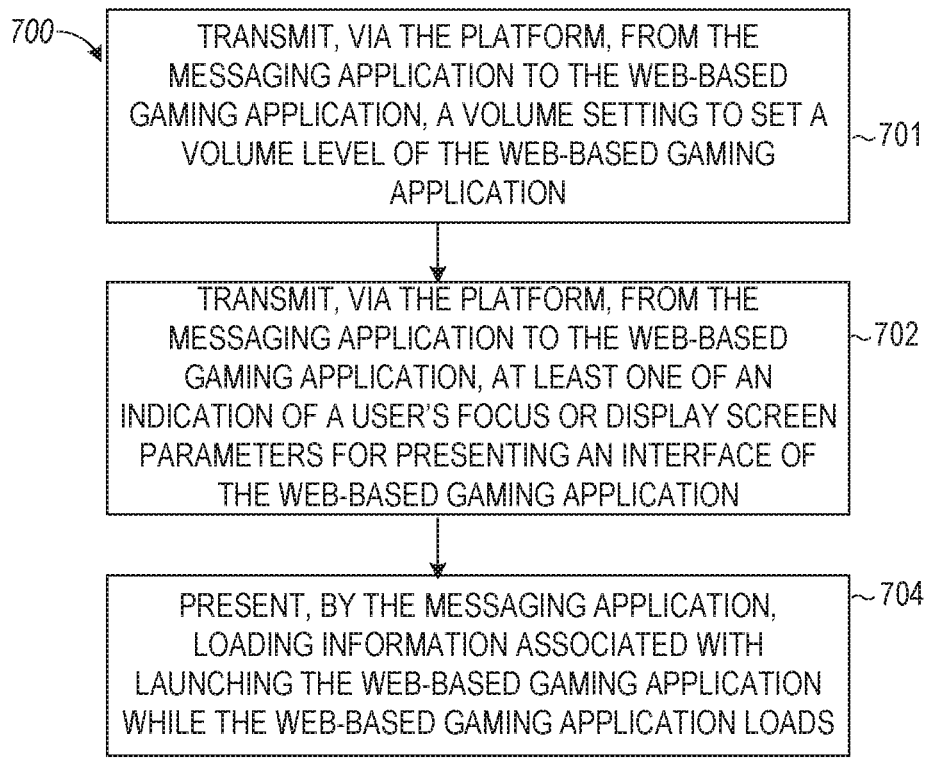

FIG. 3 is a schematic diagram illustrating a structure of a message 300, according to some embodiments, generated by a messaging client application 104 for communication to a further messaging client application 104, the messaging server application 114, and to web-based gaming application server 107 (e.g., in response to functions being invoked in the API). The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300 or text identifying a given API function and data associated with its parameters.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

A message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message 300 (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

FIGS. 4-7 are flowcharts illustrating example operations of the gaming application platform 124 in performing processes 400-700 for facilitating interactions between a messaging application and a web-based gaming application, according to example embodiments. The processes 400-700 may be embodied in computer-readable instructions for execution by one or more processors such that the operations of the processes 400-700 may be performed in part or in whole by the functional components of the messaging server system 108; accordingly, the processes 400-700 are described below by way of example with reference thereto. However, in other embodiments, at least some of the operations of the processes 400-700 may be deployed on various other hardware configurations. The processes 400-700 are therefore not intended to be limited to the messaging server system 108.

Process 400 may be performed by the gaming application platform 124 to integrate a feature of the messaging application into the web-based gaming application. At operation 401, the gaming application platform 124 provides a platform that facilitates communication between a messaging application and a web-based gaming application. For example, the gaming application platform 124 may store an SDK with various API functions that enable a web-based gaming application implemented on web-based gaming application server 107 to access a feature and integrate the feature of the messaging client application 104. The SDK may be accessed by a game developer by downloading the SDK from the gaming application platform 124 and installing the functions of the SDK in the code for the game. Various functions of the SDK can be invoked in the code for the game to integrate various features of the messaging application (e.g., a voice party, a chat interface, a leaderboard etc.). Similarly, functions of the SDK can be invoked by the messaging client application 104 to provide one or more features to a given web-based gaming application.

At operation 402, the messaging application launches, via the gaming application platform 124, the web-based gaming application. For example, the messaging client application 104 may present icons to a user representing various web-based gaming applications. In response to receiving a user selection of one of the icons, the messaging client application 104 may retrieve the HTML5 file of the corresponding web-based gaming application and initiate resources needed by the gaming application. The messaging client application 104 may then send an instruction to web-based gaming application server 107 to launch the corresponding game. In particular, the HTML5 file of the gaming application, upon being opened or accessed by the messaging client application 104, may invoke an initialize function of the SDK of the gaming application platform 124.

Once invoked, the initialize function obtains various features of the messaging client application 104 and generates a response message for transmission to the gaming application. Specifically, the messaging client application 104 may include a conversation identifier, a gaming application identifier, one or more attributes of the conversation (e.g., conversation size, participants, font color of each participant's message text), user identifier information, display screen parameters (indicating regions of the display that can be occupied by the gaming user interface and regions of the display that will be occupied by the features of the messaging application), a context (e.g., whether the game was launched from a discovery screen of the messaging application, a conversation, an instant message, a non-conversation interface, etc.), and a geographical region.

At operation 404, the context of the messaging application from which the web-based gaming application was launched is determined. For example, the messaging client application 104 may determine whether the game was launched from a discovery screen of the messaging application, a conversation, an instant message, or a non-conversation interface and include this information in the message response of the initialize function.

At operation 406, the context of the messaging application is communicated, via the platform, to the web-based gaming application. For example, the messaging client application 104 generates a response message in accordance with the initialize API function that includes the determined context. The message 300 is transmitted to the web-based gaming application as a response to the invoked API initialize function. The web-based gaming application processes the message 300 returned from the messaging client application 104 to determine the context from which the gaming application was launched.

At operation 408, a feature of the messaging application is integrated, via the platform, into the web-based gaming application based on the context from which the web-based gaming application was launched. For example, the messaging application shares user data with the web-based gaming application based on the context from which the game was launched. Specifically, if the game was launched from a conversation, the messaging application includes attributes of the conversation in a response message for transmission to the gaming application. In response to receiving the conversation attributes, the gaming application presents data from the conversation (e.g., identifiers of conversation participants, font colors of the participant messages, etc.) together with the gaming interface to integrate the conversation into the game. Alternatively, if the game was launched from a discovery screen (or a non-conversation interface), only the user identifier may be provided and shared with the gaming application. In response to the game receiving a user request to invite another user to the game, the game invokes a play with friends function to cause the messaging application to present a list of the user's friends to the user (without actually sending the list of friends to the game). Once the user selects the friends from the list whom the user would like to invite to the game, the identifiers of only the selected friends are transmitted from the messaging application to the gaming application to add the selected friends to the gaming interface and integrate the selected friends into the game.

Process 500 may be performed by the gaming application platform 124 to authorize the web-based gaming application to integrate a feature of the messaging application. At operation 501, the web-based gaming application is authorized to integrate the feature of the messaging application. For example, at prespecified time intervals (e.g., every 90 seconds), the gaming application invokes the function to provide an authentication token. A message 300 is sent to the messaging application through the gaming platform indicating that the token authentication function was invoked. In response, the messaging application determines whether the gaming application calling the function is allowed to communicate with the messaging application. If the gaming application is allowed to communicate with the messaging application, the messaging application provides a unique token in a response message via the platform to the gaming application. In certain embodiments, a gaming application is determined to be allowed to communicate with the messaging application if the gaming application was launched directly from the messaging application. In this way, if the user tried to access the gaming application through a website associated with the gaming application without going through the messaging application, the gaming application will be determined to not be allowed to communicate with the messaging application and will not be provided with the authentication token. Additional gaming data needed to run the gaming application will not be accessible to the game which in turn restricts the gaming application to being allowed to be launched only directly through the messaging application.

At operation 502, an authentication token that expires after a prespecified period of time is provided to the web-based gaming application. For example, the token provided in the message 300 from the messaging application to the gaming application may only be valid for 90 seconds. If the gaming application communicates with an expired token with the messaging application, the gaming application will not get a response from the messaging application or will be instructed by the messaging application that the token is expired. Further gaming data (e.g., gaming application data 207) will no longer be made available to the gaming application.

At operation 505, gaming data is processed by the web-based gaming application using the authentication token. For example, any function that the gaming application invokes of the SDK of the messaging application may require a token to be provided to authenticate and authorize the gaming application. In this way, access to gaming application data 207 and gaming application API functions 209 is limited to gaming applications that have a valid token obtained via the authentication token function.

At operation 506, a determination is made as to whether the context indicates that the gaming application was launched from a conversation interface. In response to determining that the gaming application was launched from a conversation interface of the messaging application, the process proceeds to operation 507, otherwise the process proceeds to operation 509.

At operation 507, data related to the conversation is provided to the web-based gaming application to integrate the conversation into the web-based gaming application. For example, if the game was launched from a conversation, the messaging application includes attributes of the conversation in a response message for transmission to the gaming application. In response to receiving the conversation attributes, the gaming application presents data from the conversation (e.g., identifiers of conversation participants, font colors of the participant messages, etc.) together with the gaming interface to integrate the conversation into the game.

At operation 508, a graphical user interface aspect of the web-based gaming application is modified based on the data related to the conversation. For example, the gaming application may obtain the font colors of the conversation and modify a background or player colors in the game itself to match the font colors of the conversation. Specifically, a color of a player's hat or article of clothing may be modified to match the font color used by the user associated with that player in the conversation.

At operation 509, a social-based feature of the messaging application is prevented from being available to the web-based gaming application. For example, if the game was launched from a discovery screen (or a non-conversation interface), only the user identifier may be provided and shared with the gaming application. In response to the game receiving a user request to invite another user to the game, the game invokes a play with friends function to cause the messaging application to present a list of the user's friends to the user (without actually sending the list of friends to the game). Once the user selects those friends from the list whom the user would like to invite to the game, the identifiers of only those selected friends are transmitted from the messaging application to the gaming application to add those friends to the gaming application interface and integrate those friends into the game.

As another example, the user's avatar from the messaging application may only be made available to the gaming application in response to the gaming application invoking a fetch avatar image function. Specifically, the gaming application may determine a need to include a user's avatar next to score information presented in the gaming application. In this scenario, the gaming application, after being launched, invokes the fetch avatar image function which passes a message 300 to the messaging application with the user's identification information. The messaging application then generates a response message that includes an image representing the user's avatar obtained from the message application (or a link to the avatar image) and provides the response to the gaming application through the platform. The gaming application then integrates the user's avatar by displaying the avatar next to the score information in the game interface.

Process 600 may be performed by the gaming application platform 124 to provide a reward video to the web-based gaming application and a leaderboard. At operation 601, the messaging application receives, via the platform, from the web-based gaming application a reward video request. For example, the gaming application may decide to give the user the opportunity to purchase or receive an upgrade at a reduced cost or for free if the user watches one or more advertisements. In response, the gaming application invokes a reward video related function to cause one or more advertisements to be presented to the user.

At operation 602, the messaging application selects a reward video. As an example, the gaming application invokes a get unconsumed reward video function. This function causes the messaging application to retrieve an advertisement video from the reward video system 125 that the reward video system 125 determines, based on a user profile, has not been delivered to the user. The messaging application provides the gaming application a unique identifier of each selected reward video. As another example, the gaming application invokes a retrieve reward video function that provides the unique identifier of the reward video. This function causes the messaging application to prepare a reward video advertisement corresponding to the unique identifier to be displayed later during gameplay. This ensures that when the user decides to view a reward video advertisement, the advertisement can be delivered to the user without delay. Specifically, in response to determining that the retrieve reward video function has been invoked by the gaming application, the messaging application communicates with the reward video system 125 to select and mark one or more video advertisements that match a user profile and that match the unique identifier provided by the gaming application. The selected and marked video advertisements is cached in a user's profile for a prespecified period of time until the gaming application informs the messaging application to present the cached video advertisements by way of invoking a watch reward video function. In some cases, the gaming application invokes a reward video ready function to determine whether the one or more video advertisements matching a unique identifier have been cached by the messaging application and are ready to present to the user. In some cases, the messaging application invokes a reward video ready function to inform the gaming application that the requested reward video advertisement is ready to be shown to the user. This function may include the unique identifier of the reward video that is ready to be presented.

At operation 604, the messaging application transmits, via the platform, to the web-based gaming application, an indication of consumption of the reward video. For example, once the messaging application starts presenting the reward video to the user in response to the watch reward video function being invoked, the messaging application informs the gaming application through the platform that the reward video matching a unique identifier has started being consumed. The gaming application may invoke a consume reward video function to inform the messaging application that the reward video has been consumed. The messaging application may invoke a reward video complete function to inform the gaming application that the requested reward video advertisement matching the unique identifier has been completely consumed by the user. In some implementations, the gaming application, in response to receiving the message 300 from this function that the reward video was consumed, makes available to the user the reward associated with the video (e.g., the selected game upgrade or update to the score).

At operation 606, a leaderboard managed by the messaging application is updated in response to receiving game score information from the web-based gaming application. For example, the gaming application may invoke a submit score to leaderboard function. This function may include a leaderboard identifier and score information that are passed in a message 300 to the messaging application. Based on the leaderboard identifier and score information, the messaging application updates the corresponding leaderboard associated with the leaderboard identifier with the updated score information. In this way, the messaging application can maintain a leaderboard for a game without providing the game any sensitive information about who is in the leaderboard. Namely, the messaging application rather than the gaming application maintains the leaderboard and has exclusive access to updating the leaderboard. The messaging application may determine leaders on the leaderboard on a geographical region basis or among a user's friends.

At operation 608, the leaderboard is presented by the messaging application to a user in response to receiving a leaderboard request from the web-based gaming application. For example, when the gaming application determines a need to present a leaderboard to a user (e.g., at the end of a stage or match or in response to receiving a user selection of a leaderboard button), the gaming application invokes a leaderboard function. The leaderboard function passes a message 300 to the messaging application that identifies the leaderboard and causes the messaging application to present the leaderboard corresponding to the leaderboard identifier to the user. In this way, the leaderboard can be presented to the user without providing information to the gaming application about the status of various users on the leaderboard.

Process 700 may be performed by the gaming application platform 124 to communicate volume settings, focus information and loading information between the messaging application and the web-based gaming application. At operation 701, the messaging application transmits, via the gaming application platform 124, to the gaming application, a volume level of the web-based gaming application. For example, a user during gameplay in the gaming application may decide to conduct a voice party with the user's friends that are in the conversation playing the game. The voice party may allow each of the users to talk via a microphone and hear each other through the speakers during gameplay to avoid the need to type messages 300 during gameplay. In response to the messaging application detecting activation of the voice party feature of the messaging application, the messaging application may invoke the function to set a volume of the web-based gaming application. Specifically, this function may pass a message 300 to the gaming application from the messaging application setting a volume of the web-based gaming application relative to the volume of the voices output by the speakers. In some embodiments, the volume of the web-based gaming application is set to 50% of the volume of the voice party line. In this way, the user's voice volume is greater than the volume of the web-based gaming application so it is easier for the users involved in the voice party line to hear each other. In some implementations, the gaming application does not receive information from the messaging application about the level of the volume of the voice party line or any of the communications on the voice party line. All of the user's voice information is exchanged solely through the messaging application and the voice information and processing is handled by the messaging application. The messaging application simply informs the gaming application to set the volume to a particular level that the messaging application selects based on the volume set for the voice party line. In some other implementations, the volume of the voice party line is communicated to the gaming application with an instruction indicating how much to set the gaming application volume relative to the voice party line volume.

At operation 702, at least one of an indication of a user's focus or display screen parameters are transmitted, via the platform, from the messaging application to the web-based gaming application. For example, the messaging application invokes a did lose focus function to inform the gaming application that the user has lost focus from the game and why. This informs the game that certain game elements can not be selected on the screen because the user's focus has shifted to a different application or a different feature of the messaging application. The feature may block the portion of the screen displaying the web-based gaming application which prevents the user from interacting with the game. In response, the gaming application pauses or terminates gameplay. The messaging application may invoke a did gain focus function to inform the game that the user has re-gained focus for the game. This means that the user has stopped focusing on the application or feature that was obstructing view of the game and can now again interact with the game. In response, the gaming application may resume gameplay.

At operation 704, the messaging application presents loading information associated with launching the web-based gaming application while the web-based gaming application loads. For example, the gaming application invokes the loading progress function to indicate to the messaging application the loading progress of the web-based gaming application. This function may be invoked after the initialize function is invoked by the game. The messaging application may present a loading progress bar reflecting the loading progress of the game. Once the game has finished loading, the gaming application invokes the loading complete function which indicates to the messaging application that loading of the web-based gaming application has completed. In response to receiving this indication, the messaging application removes the loading progress bar and present the interface of the gaming application.

Figure 8:
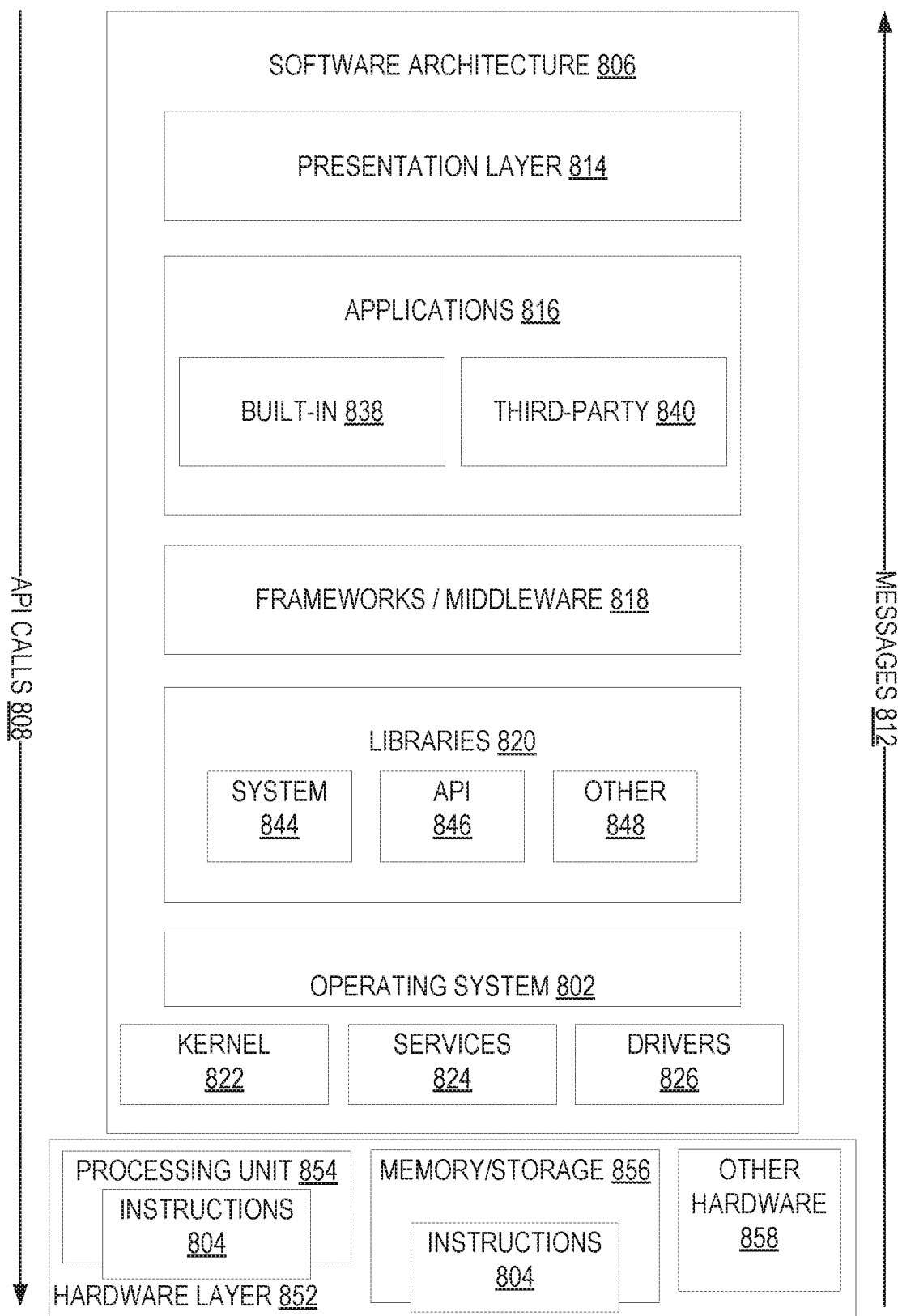
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic UI (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
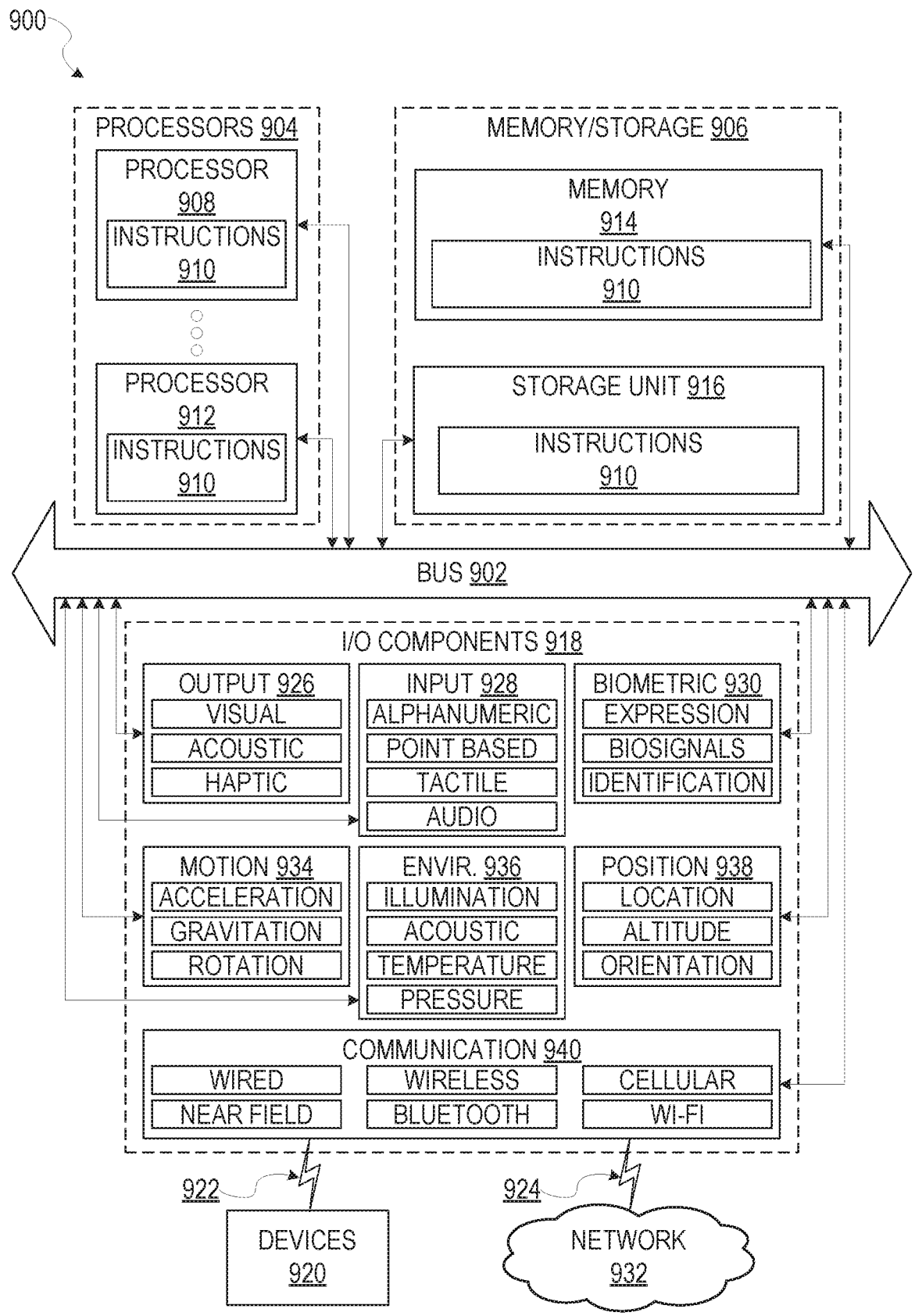
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions 910 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors 908, 912 (sometimes referred to as "cores") that may execute instructions 910 contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components. Bluetooth® components (e.g., Bluetooth® Low Energy). Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph. MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 932 using a transitory or non-transitory transmission medium via a network interface device and using any one of a number of well-known transfer protocols.

"CLIENT DEVICE" in this context refers to any machine 900 that interfaces to a communications network 932 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 932.

"COMMUNICATIONS NETWORK" in this context refers to one or more portions of a network 932 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks 106. For example, a network 106 or a portion of a network 106 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message 812 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 812 is transitory.

"MACHINE-READABLE MEDIUM" in this context refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 904 or other programmable processor 904. Once configured by such software, hardware components become specific machines (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code." etc.) and which produces corresponding output signals that are applied to operate a machine 900. A processor 904 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor 904 having two or more independent processors (sometimes referred to as "cores") that may execute instructions 910 contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    providing a platform that facilitates communication between a messaging application and a web-based gaming application;
    launching, via the platform, the web-based gaming application from the messaging application;
    determining context of the messaging application from which the web-based gaming application was launched;
    communicating, via the platform, the context of the messaging application to the web-based gaming application;
    integrating, via the platform, a feature of the messaging application into the web-based gaming application based on the context from which the web-based gaming application was launched;
    identifying, by the messaging application, a set of advertisement videos that have not been previously delivered to a user of the messaging application;
    transmitting to the web-based gaming application one or more identifiers of the advertisement videos in the set of advertisement videos; and
    tracking, by the messaging application, which advertisement videos in the set have been watched.

2. The method of claim 1, wherein determining the context comprises determining that the web-based gaming application was launched from a conversation, a content discovery interface of the messaging application, or a notification received by a user of the messaging application.

3. The method of claim 1, further comprising:
    determining that the context indicates that the web-based gaming application was launched from a conversation interface comprising messages exchanged between users; and
    in response to determining that the context indicates that the web-based gaming application was launched from the conversation:
    providing data related to the conversation to the web-based gaming application to integrate the conversation into the web-based gaming application; and
    causing the web-based gaming application to avoid prompting the user to select game participants.

4. The method of claim 3, wherein the data related to the conversation includes a conversation text color, further comprising modifying a graphical user interface aspect of the web-based gaming application based on the conversation text color.

5. The method of claim 1, further comprising:
    determining that the context indicates that the web-based gaming application was launched from a non-conversation interface; and
    in response to determining that the context indicates that the web-based gaming application was launched from the non-conversation interface:
    preventing a social based feature of the messaging application from being available to the web-based gaming application; and
    causing the web-based gaming application to prompt a user to select game participants.

6. The method of claim 1, wherein providing the platform comprises:
    storing an application programming interface (API), associated with the messaging application on a server; and
    establishing, via a JavaScript bridge, two one-way asynchronous communication channels between the messaging application and the web-based gaming application, wherein functions of the API, invoked by the web-based gaming application or the messaging application, are transmitted as messages over the asynchronous communication channels.

7. The method of claim 1, further comprising:
authorizing, via the platform, the web-based gaming application to integrate the feature of the messaging application.

8. The method of claim 1, further comprising:
caching an advertisement video in a user profile;
transmitting an indication to the web-based gaming application indicating that the advertisement video is ready; and
providing the cached advertisement video from the messaging application to the web-based gaming application during gameplay of the web-based gaming application responsive to a request from the web-based gaming application.

9. The method of claim 1, further comprising:
transmitting an indication of focus from the messaging application to the web-based gaming application, the indication of focus indicates one or more game elements that are blocked by another application preventing a user from interacting with the web-based gaming application; and
causing the web-based gaming application to pause of terminate gameplay in response to receiving the indication of focus.

10. The method of claim 7, further comprising:
preventing the web-based gaming application from being authorized based on the web-based gaming application being launched from an application that is different from the messaging application.

11. The method of claim 1, further comprising:
receiving, via the platform, loading information associated with launching the web-based gaming application;
while the messaging application determines, based on the loading information, that the web-based gaming application is loading, presenting a loading screen to a user; and
after the messaging application determines, based on the loading information, that the web-based game has finished loading, removing presentation of the loading screen and presenting an interface of the web-based gaming application to the user.

12. The method of claim 1, further comprising:
setting a volume of the web-based gaming application relative to volume of voices of participants in the web-based gaming application; and
providing access to an avatar of a user, via the platform, to the web-based gaming application from the messaging application.

13. The method of claim 1 further comprising:
receiving, via the platform, by the messaging application from the web-based gaming application, a reward video request;
in response to receiving the reward video request, causing the messaging application to select a reward video; and
transmitting, via the platform, to the web-based gaming application, an indication of consumption of the reward video responsive to the messaging application determining that the reward video has been viewed to completion.

14. The method of claim 1, further comprising:
receiving, via the platform, by the messaging application from the web-based gaming application, game score information;
updating a leaderboard managed by the messaging application in response to receiving the game score information;
receiving, via the platform, by the messaging application from the web-based gaming application, a leaderboard request; and
in response to receiving the leaderboard request, presenting, by the messaging application, the leaderboard on a user interface.

15. The method of claim 1, further comprising:
transmitting, via the platform, from the messaging application to the web-based gaming application, a volume setting to set a volume level of the web-based gaming application, wherein a volume of gaming content of the web-based gaming application is different from a volume of voice content provided by the messaging application; and
transmitting, via the platform, from the messaging application to the web-based gaming application, at least one of an indication of a user's focus or display screen parameters for presenting an interface of the web-based gaming application.

16. A system comprising:
one or more processors; and
a memory that stores instructions, that when executed by the one or more processors, configure the one or more processors to perform operations comprising:
providing a platform that facilitates communication between a messaging application and a web-based gaming application;
launching, via the platform, the web-based gaming application from the messaging application;
determining context of the messaging application from which the web-based gaming application was launched;
communicating, via the platform, the context of the messaging application to the web-based gaming application;
integrating, via the platform, a feature of the messaging application into the web-based gaming application based on the context from which the web-based gaming application was launched;
identifying, by the messaging application, a set of advertisement videos that have not been previously delivered to a user of the messaging application;
transmitting to the web-based gaming application one or more identifiers of the advertisement videos in the set of advertisement videos; and
tracking, by the messaging application, which advertisement videos in the set have been watched.

17. The system of claim 16, wherein the operations further comprise:
determining that the context indicates that the web-based gaming application was launched from a conversation; and
in response to determining that the context indicates that the web-based gaming application was launched from the conversation:
providing data related to the conversation to the web-based gaming application to integrate the conversation into the web-based game; and
causing the web-based gaming application to avoid prompting a user to select game participants.

18. A non-transitory machine-readable storage medium that includes instructions that, when executed by one or more processors of a machine, cause the machine to perform operations comprising:
providing a platform that facilitates communication between a messaging application and a web-based gaming application;

launching, via the platform, the web-based gaming application from the messaging application;

determining context of the messaging application from which the web-based gaming application was launched;

communicating, via the platform, the context of the messaging application to the web-based gaming application;

integrating, via the platform, a feature of the messaging application into the web-based gaming application based on the context from which the web-based gaming application was launched;

identifying, by the messaging application, a set of advertisement videos that have not been previously delivered to a user of the messaging application:

transmitting to the web-based gaming application one or more identifiers of the advertisement videos in the set of advertisement videos; and tracking, by the messaging application, which advertisement videos in the set have been watched.

19. The non-transitory machine-readable storage medium of claim 18, wherein the operations further comprise:

determining that the context indicates that the web-based gaming application was launched from a conversation; and in response to determining that the context indicates that the web-based gaming application was launched from the conversation:

providing data related to the conversation to the web-based gaming application to integrate the conversation into the web-based game; and causing the web-based gaming application to avoid prompting a user to select game participants.

* * * * *

UNITED STATES PATENT AND TRADEMARK OFFICE
CERTIFICATE OF CORRECTION

PATENT NO. : 10,778,623 B1
APPLICATION NO. : 16/177335
DATED : September 15, 2020
INVENTOR(S) : Wu et al.

It is certified that error appears in the above-identified patent and that said Letters Patent is hereby corrected as shown below:

In the Claims

In Column 27, Line 15, in Claim 18, delete "application:" and insert --application;-- therefor Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*